United States Patent
Spyker (10) Patent No.: US 9,703,821 B2
(45) Date of Patent: Jul. 11, 2017

(54) DATABASE AUDITING FOR BULK OPERATIONS

(71) Applicant: International Business Machines Corporation, Armonk, NY (US)

(72) Inventor: James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/399,858

(22) Filed: Jan. 6, 2017

(65) Prior Publication Data

US 2017/0124136 A1    May 4, 2017

Related U.S. Application Data

(62) Division of application No. 14/041,454, filed on Sep. 30, 2013.

(51) Int. Cl.
*G06F 7/00* (2006.01)
*G06F 17/30* (2006.01)

(52) U.S. Cl.
CPC .. *G06F 17/30368* (2013.01); *G06F 17/30339* (2013.01); *G06F 17/30371* (2013.01); *G06F 17/30377* (2013.01); *G06F 17/30575* (2013.01)

(58) Field of Classification Search
CPC ................................................ G06F 17/30371
See application file for complete search history.

(56) References Cited

U.S. PATENT DOCUMENTS

| | | |
|---|---|---|
| 7,080,072 B1 | 7/2006 | Sinclair |
| 7,124,141 B2 | 10/2006 | Norcott |
| 7,127,448 B1 | 10/2006 | Wong |
| 7,647,354 B2 | 1/2010 | Norcott |
| 7,685,109 B1 | 3/2010 | Ransil et al. |
| 7,801,912 B2 | 9/2010 | Ransil et al. |
| 8,352,450 B1 | 1/2013 | Mraz et al. |
| 8,386,533 B2 | 2/2013 | Venkata Naga Ravi |
| 8,392,400 B1 | 3/2013 | Ransil et al. |
| 2003/0037029 A1 | 2/2003 | Holenstein et al. |
| 2006/0200501 A1 | 9/2006 | Holenstein et al. |
| 2009/0100089 A1 | 4/2009 | Eadon et al. |
| 2015/0095286 A1 | 4/2015 | Spyker |
| 2015/0095287 A1 | 4/2015 | Spyker |

FOREIGN PATENT DOCUMENTS

WO    2012138437 A1    10/2012

OTHER PUBLICATIONS

Cisco, "Audit Logs," Cisco Unified Serviceability Administration Guide Release 9.0(1). pp. 1-4.
Corbett, J., et al., "Spanner: Google's Globally-Distributed Database," OSDI'12 Proceedings of the 10th USENIX conference on Operating Systems Design and Implementation. pp. 251-264. Google, Inc. USENIX Association Berkeley, CA, USA © 2012.

*Primary Examiner* — Ajith Jacob
(74) *Attorney, Agent, or Firm* — Peter J. Edwards (57) ABSTRACT

A method facilitates auditing of database transactions by maintaining logical consistency between a source database table and a shadow database table. A bulk command is received that specifies edits to a plurality of rows in the source database table. The bulk command is executed on the source database table. The shadow database table is queried to obtain an indication of the plurality of rows edited by the bulk command. The indication is stored as part of an audit trail for the source database table.

6 Claims, 4 Drawing Sheets

DATABASE AUDITING FOR BULK OPERATIONS

FIELD

This disclosure relates to auditing of database transactions. In particular, it relates to generating an audit trail with more specificity than indicated by database operation requests.

BACKGROUND

Database systems can be used in a variety of different fields and applications, some of which can involve sensitive data that should be protected. Providing information security for sensitive data contained within such database systems can be a complex and challenging endeavor. In addition to protecting the data from external threats (e.g., unauthorized access to or destruction of data), internal threats can pose problems. For instance, an individual authorized to access the database may still misuse the sensitive information.

For these and other reasons, certain database systems can facilitate auditing of database transactions by creating a log of database related activity. This auditing can include recording information that identifies which data was affected by a particular database transaction along with other useful information, such as a timestamp and identification of a user that initiated the transaction. The specificity of the auditing can sometimes be determined by regulatory requirements, which can be created and enforced by oversight bodies, such as governmental agencies.

SUMMARY

In certain embodiments of the disclosure, database replication technology can be used to produce a low-level (e.g., row-level) audit of database changes even in the case where the database changes use bulk (e.g., partition-level) operations that specify the affected data with less precision than the low-level audit. Particular aspects use replication technology to maintain a shadow copy of the source table. When bulk operations are initiated, the shadow table can be queried in order to identify affected data with more particularity than what is specified by the bulk operations.

Various embodiments are directed toward a method that facilitates auditing of database transactions by maintaining logical consistency between a source database table and a shadow database table. A bulk command is received that specifies edits to a plurality of rows in the source database table. The bulk command is executed on the source database table. The shadow database table is queried to obtain an indication of the plurality of rows edited by the bulk command. The indication is stored as part of an audit trail for the source database table.

Certain embodiments are directed toward a system for facilitating auditing of database transactions. The system has a replication module that is configured to maintain logical consistency between a source database table and a shadow database table. A database management module is configured to receive a bulk command that specifies edits to a plurality of rows in the source database table, and execute the bulk command on the source database table. A row level tracking module is configured to query the shadow table to obtain an indication of the plurality of rows edited by the bulk command and store the indication as part of an audit trail for the source database table.

Embodiments are directed toward a method for row level auditing of partition operations in which a source table is replicated to create a shadow table that is hidden from users of the source table. Transactional consistency is maintained between the source table and the shadow table. In response to receiving standard row level operations for the source table, row level operations are replicated into the shadow table. In response to a partition-level operation on the source table, information about the partition-level operation is transmitted to the shadow table. Using the information about the partition-level operation, rows are retrieved from the shadow table designated as being part of the partition-level operation. A row-level entry is constructed for each retrieved row. Each row-level entry is recorded in an audit table. In response to completion of the construction of row-level entries, the partition-level operation is implemented on the shadow table.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database auditing, more particular aspects relate to database auditing for bulk operations. While the present disclosure is not necessarily limited to such applications, various aspects of the disclosure may be appreciated through a discussion of various examples using this context.

Various embodiments of the present disclosure relate to auditing of arbitrary granularity, relative to the particular database operation(s) being undertaken. If, for instance, the database operation specifies the affected data with enough detail to satisfy a desired audit trail, then an auditing module can create the desired audit trail directly from information in the database operation. Aspects of the present disclosure are directed toward facilitating the ability to create audit trails at a level not specified in the database operation. For instance, arbitrary granularity for the audit information can be obtained through the creation, maintenance and use of a second database that is a replication of the source database being operated upon. The replicated database (or shadow database) can be maintained in logical (transactional) consistency with the source database. In this manner, an auditing module or tool can query the shadow database to determine what data is affected by any particular operation, even where the operation parameters fail to identify the affected data with the desired particularity. For instance, the database can include a table having partitions with multiple rows and the operation can be a partition-level operation that specifies an operation to be performed across the entire partition; whereas, the auditing can be carried out at a row-level.

Consistent with various aspects of the present disclosure, the use of a replicated database can be particularly useful for decoupling auditing functions (e.g., the audit-level queries, processing, audit trail generation and data logging) from the source database system and its hardware. For instance, a query that returns all rows that are part of a particular partition can use up a significant amount of resources, whether in hardware (memory, processing power), network bandwidth, time or other resources. By performing the query on a shadow database, the source database system can continue with substantive, further operations, while the shadow database system completes the query using separate hardware. Thus, each operation can be performed in parallel using different hardware circuits and software. This can be particularly applicable when the database operation provides efficiencies by operating on data in bulk.

Consistent with various embodiments, auditing functions can be provided for a database that contains one or more tables. Tables can be logical structures made up of columns and rows, which can be maintained by a database manager. A table can be partitioned by subdividing the table into smaller pieces, each piece called a partition. Each partition can be given an identification or name, and may have its own storage characteristics (e.g., stored on a different physical device).

Embodiments of the present disclosure are directed toward bulk operations that operate on multiple rows of data independent of an identification of the row (e.g., the row number). For instance, bulk operations can include operations performed on all rows that have a specific value in a column field, or operations made on a partition-level. Large databases can often benefit from the use of partitioned tables. A partitioned table can facilitate actions (such as loading, deleting or truncating) that are carried out on large groups of data. For instance, partitioned tables can allow data to be loaded into an empty table that is not being used by the database system. Once the data is loaded to the empty table, it can be switched into the active database. This switch can include a metadata change that quickly executes and which allows for large amounts of data to be loaded with limited impact to users of database and source/live table. For similar reasons, partitioned tables can also be useful for efficient deletion or truncating of data.

In various embodiments, the partitions can be configured to correspond to logical and physical boundaries of the storage devices upon which the database table is stored. For instance, each partition can be stored on a respective and different hardware resource (e.g., different hardware partitions of a storage drive, a different storage devices, etc.). Partitioning can thereby allow for the distribution of portions of individual tables across a file system according to desired configurations or rules.

Partitioning can allow for bulk operations, such as deletion, to be carried out without individually addressing each row that is deleted. Without having to identify or access each individual row, the operation can be significantly faster. The act of creating an audit trail for each row, however, can cancel out much of this potential benefit as the operation can be delayed significantly while the row-level information is obtained for the audit trail. The audit trail can include recording information such as the identification of data affected by a particular database transaction along with other useful information, such as a timestamp and identification of a user that initiated the transaction.

Aspects of the present disclosure can be particularly useful for allowing the source database table to perform bulk (partition level) operations without waiting for an audit trail to be created. In particular implementations, the audit trail can be created using a replicated version of the source table that can be queried to obtain the low-level (e.g., row-level) information for the bulk operations. In this manner, the bulk operation can be completed and the source database can be made available while the audit trail is still being created from the replicated (shadow) database.

Various embodiments are directed toward a method for row-level auditing of partition operations where the source table is replicated in order to create a shadow table that is hidden from users of the source table. Transactional consistency is maintained between the source table and the shadow table by, for example, replicating edits to the source table into the shadow table. This can include replicating, in response to receiving standard row level operations for the source table, row level operations into the shadow table. In response to a partition-level operation on the source table, information about the partition-level operation can be transmitted to the shadow table. Using the information about the partition-level operation, rows can be retrieved from the shadow table. The retrieved rows can be those rows that are designated as being part of the partition-level operation. A row-level entry can be constructed for each retrieved row and then recorded in an audit table. In response to completion of all row-level entries, the partition-level operation can be implemented on the shadow table to maintain consistency between the tables.

Partitioning can be carried out using a variety of different mechanisms including, but not limited to, range, list, hash or combinations thereof. Range partitioning can involve the use of value based ranges (e.g., dates) that specify which row belongs to a specific partition. List partitioning can use an explicitly identified list of values for each partition. Hash partitioning can use a hashing function to specify to which partition a particular row belongs. Combinations of such partitioning mechanisms are also possible.

Figure 1:
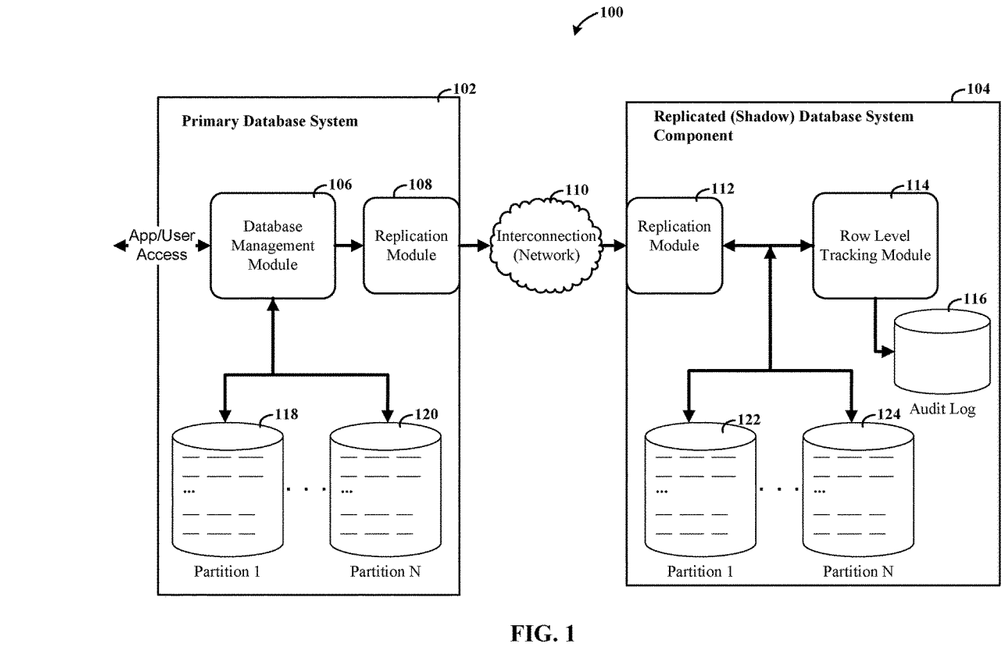
FIG. 1 depicts a system diagram of a database system for providing auditing functions, consistent with embodiments of the present disclosure.

Turning now to the figures, FIG. 1 depicts a system diagram of a database system for providing auditing functions, consistent with embodiments of the present disclosure. The database system 100 of FIG. 1 includes two database (sub)systems, a primary database system 102, and a replicated (shadow) database system 104. The primary database system 102 stores a database table in one or more partitions 118, 120. Access to the stored data from the primary database system 102 can be provided by database management module 106. This access can include any number of different database operations including, but not necessarily limited to, storing data, retrieving data, manipulating data, updating data or combinations thereof.

Consistent with certain embodiments, the database partitions 118, 120 represent separately identifiable partitions for a common database table. The database management module 106 can support bulk operations that perform operations on all elements within a particular partition. In certain embodiments, the bulk operations can be performed without independently accessing each row within the partition being acted upon. As discussed herein, the ability to perform actions at a partition level can be particularly useful for efficiency, bandwidth, processing resources, time and combinations thereof.

Aspects of the present disclosure are directed toward creating a row-level audit trail for bulk (transition-level) operations without requiring the primary database system 102 to individually address or identified each row affected by the operation. For instance, a replicated (shadow) database system 104 can include database partitions 122, 124, which are replicated copies of the database partitions 118, 120. The replication can be carried out using one or more replication modules 108, 112, which can also maintain logical consistency between the database partitions 118, 120 and the database partitions 122, 124 by performing matching database operations on each set of partitions. According to embodiments, this consistency can be maintained by sending a copy of database operations to the replicated database system 104 using an interconnection or network 110. Various embodiments allow for the copied operations to be sent at the same time that the original operations are carried out, sent periodically or queued for a period of time. Consistent with various embodiments, the replicated database system 104 can use replication solutions that are also designed for use in other contexts including, but not necessarily limited to, backup, redundancy or a distributed database management system that ensures that changes, additions, and deletions performed on the primary database are reflected in the replicated database.

Consistent with embodiments of the present disclosure, row-level tracking module 114 can query one or more of the database partitions 122, 124 in response to replication module 112 receiving a bulk (partition-level) database operation. This query can seek to identify all rows that are part of the bulk database operation. The results of the query can then be used to generate an audit trail, which can be stored in an audit log 116. Once the results of the query are obtained, the replication module 112 can carryout the bulk operation in order to maintain consistency with the primary database system 102. In certain embodiments, the replication module 112 can serve as an interface between the row-level tracking module 114 and the database partitions 122, 124. Various embodiments are directed toward the row-level tracking module 114 having a more direct access to the database partitions 122, 124.

For instance, replication module 112 may receive an operation that specifies that all rows within partition 124 should be deleted. Row-level tracking module 114 can send a query for all rows within partition 124. Depending upon the size of the partition 124, this query may take a significant amount of time and consume significant amounts of resources. The primary database system 102 can complete the bulk operation and continue to be available while the replicated database system 104 performs the query and audit-related functions.

Figure 2:
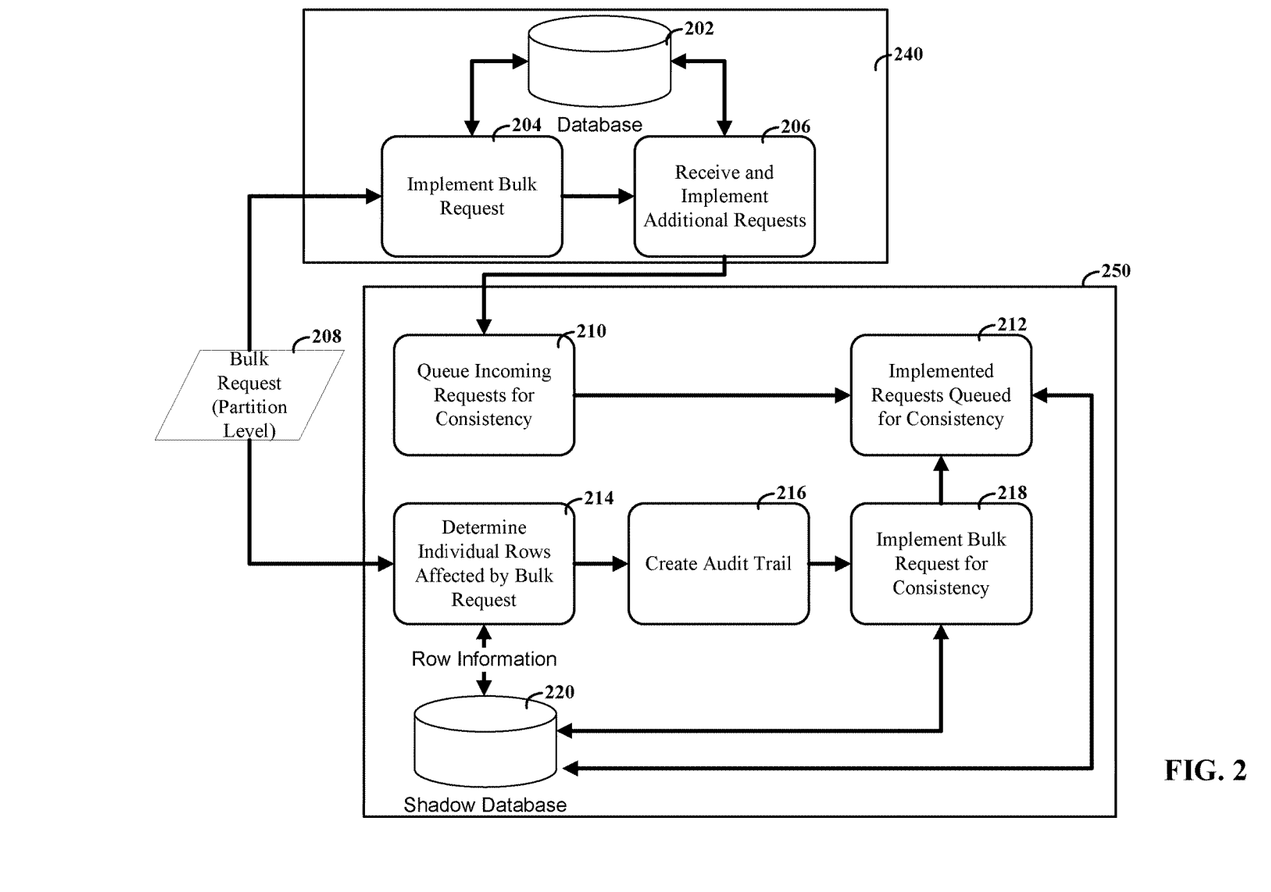
FIG. 2 depicts a flow diagram for creating an audit trail for bulk transactions, consistent with embodiments of the present disclosure.

FIG. 2 depicts a flow diagram for creating an audit trail for bulk transactions, consistent with embodiments of the present disclosure. A request for a bulk (partition-level) database operation 208 can be received from a variety of different sources. This bulk request 208 can be provided to primary database system 240 and secondary (replication and auditing) database system 250. The primary database system 240 can carry out or implement 204 the request on database 202.

The primary database system 240 can then allow for additional requests to be received and implemented 206. In this manner, primary database system 240 can carry out bulk request 208 in a manner that is substantially independent from the auditing provided by the secondary (replication and auditing) database system 250.

The secondary database system 250 can also receive the bulk request 208. In some embodiments, the primary database system 240 can transmit the request to the secondary database system 250. Various embodiments allow for the bulk request 208 to be routed to both database systems 240, 250 by another (possibly external) component or device. Once the bulk request 208 is received, the secondary database system 250 can retrieve information about what data was affected by the bulk request 208. This determination can include, for instance, querying the shadow database 220 to determine which rows correspond to the bulk request 208. For instance, the secondary database system 250 can send a query to the shadow database 220 that requests row identification information for all rows that are within a particular partition that is acted upon by the bulk request 208. Consistent with various embodiments, the query can request additional information about the affected data, such as the content of columns within the identified rows.

The results of the query information can be used to generate an audit trail (or audit log) 216. The audit trail 216 can then be stored in an audit database for subsequent use. Once the desired information has been retrieved from the shadow database 220, the bulk request 208 can be implemented 218. This allows the shadow database to maintain consistency with the source database 202.

Certain embodiments are directed toward handling database requests that arrive while the secondary database system 250 is carrying out auditing functions (e.g., database queries and audit trail creation). For instance, the primary database system 240 can process the bulk request 208 and then continue to receive and process database operation requests before the secondary database system 250 has completed the processing of the bulk request 208. Accordingly, incoming requests can be queued 210 for subsequent processing by the secondary database system 250. Once the bulk request 208 is implemented/processed 218, the queued requests can be implemented 212 in order to maintain consistency between the databases 202 and 220. Other solutions are possible to maintain consistency between database, such as occasional or periodic replication of the database 202 (e.g., as opposed to replicating each individual database operation).

Figure 3:
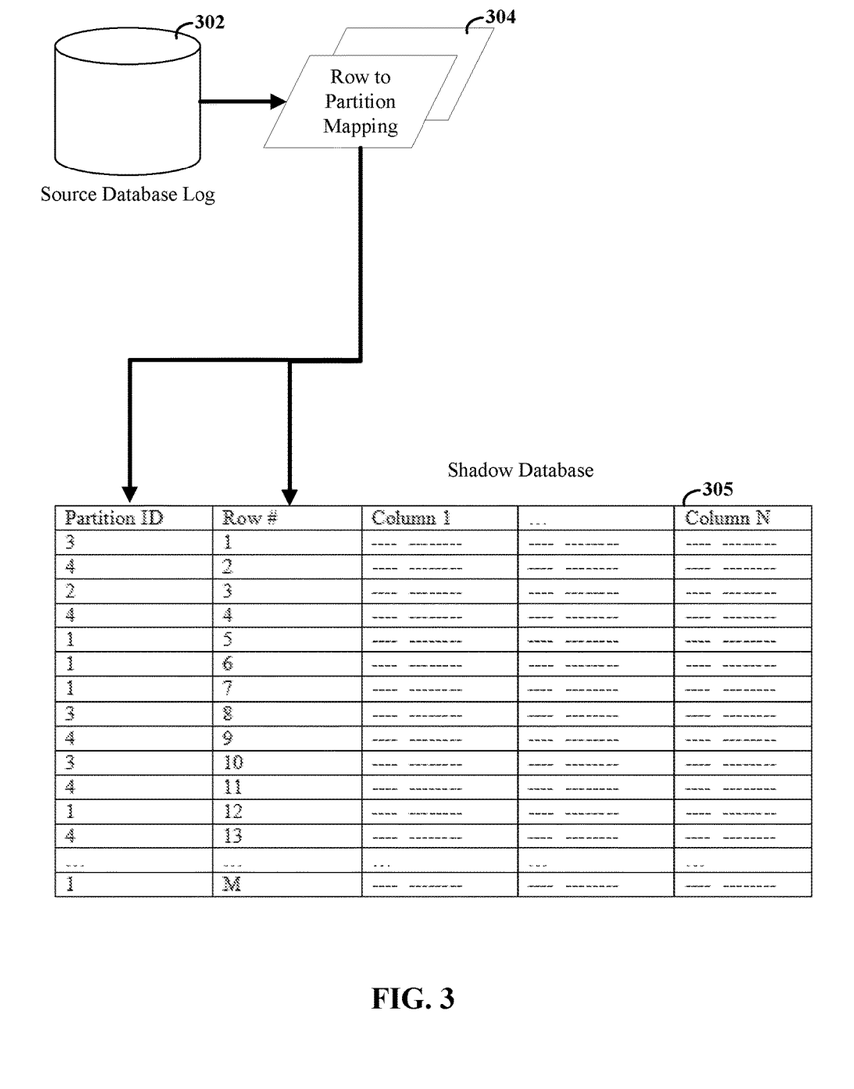
FIG. 3 depicts a flow diagram and table useful for a hash partitioned database, consistent with embodiments of the present disclosure.

FIG. 3 depicts a flow diagram and table useful for a hash partitioned database, consistent with embodiments of the present disclosure. As discussed herein, there can be many different partitioning strategies that can be used by the primary (source) database. For range partitioned tables, the replication technology can create a straightforward query to identify the rows in the shadow table that match the partition. For instance, the query can include a search for all rows meeting a range of values corresponding to the particular partition(s) being operated upon. For hash partitioned tables, it may also be possible to generate a query for a particular partition, such as where the hash function being used is known; however, it may not be efficient or even possible to generate such a query (e.g., where the hash function is not known).

Certain embodiments are directed toward facilitating the retrieval of row information for a source database that uses hash partitioning. In such instances, the database system can extract partition information (which rows are mapped to which partition) 304 from the source database log 302. This partition-to-row information 304 can then be recorded as an additional column in the shadow database table 305. This partition identification (ID) column can then be used to determine the rows matching a given partition ID. For instance, the shadow database system can send a query for all rows that include a value of "3" in the partition ID column. In the depicted table, this query would return row numbers 1, 8 and 10.

Figure 4:
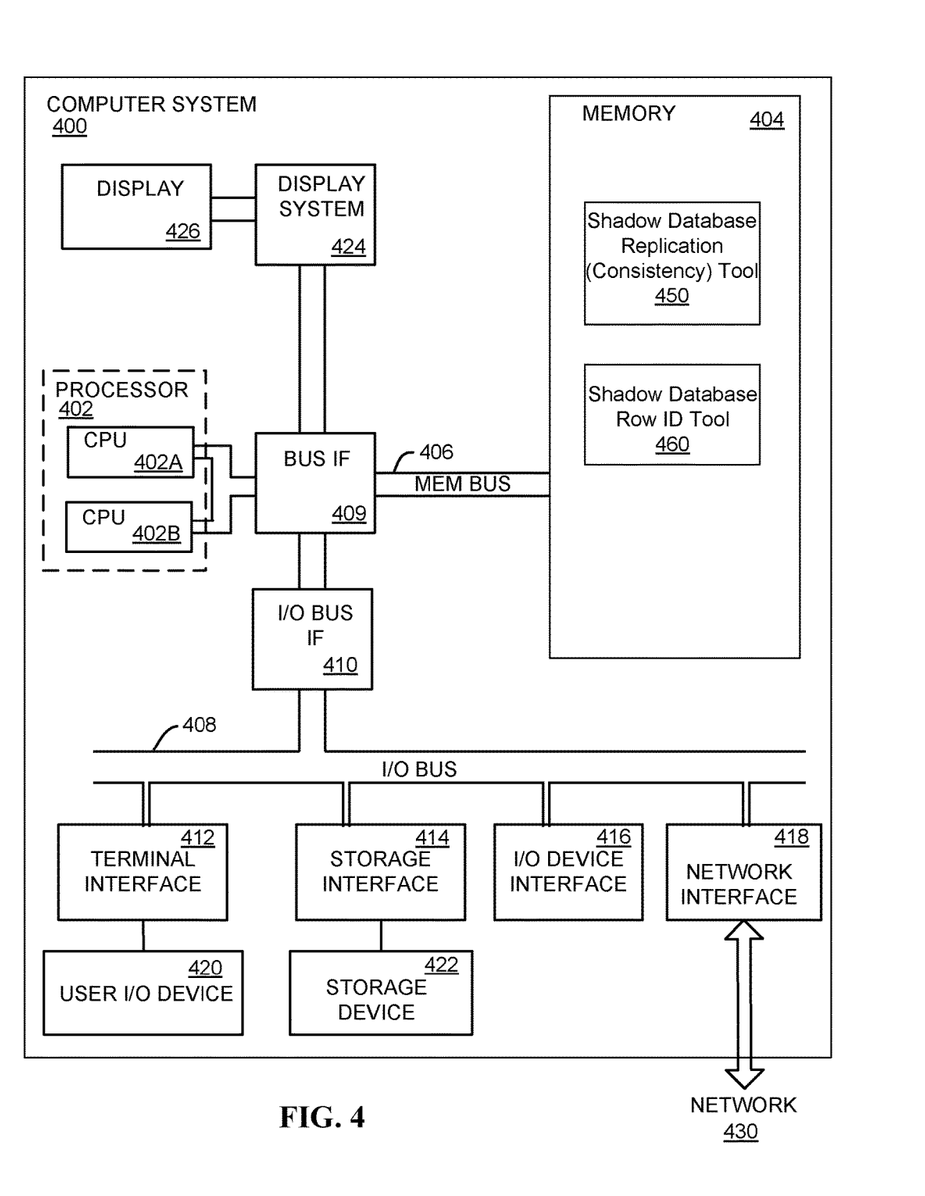
FIG. 4 depicts a high-level block diagram of a computer system for implementing various embodiments.

FIG. 4 depicts a high-level block diagram of a computer system for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, and/or storage medium (either volatile or non-volatile) for storing and/or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store a shadow database replication (consistency) tool or module 450 and/or shadow database row ID (query) tool or module 460. Consistent with certain embodiments, these tools can be implemented as part of one or more database systems. These programs and data structures are illustrated as being included within the memory 404 in the computer system 400, however, in other embodiments, some or all of them may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the shadow database replication tool 450 and the shadow database row ID tool 460 are illustrated as being included within the memory 404, these components are not necessarily all completely contained in the same storage device at the same time. Further, although the shadow database replication tool 450 and the shadow database row ID tool 460 are illustrated as being separate entities, in other embodiments some of them, portions of some of them, or all of them may be packaged together (e.g., as part of the same monitor thread).

In embodiments, the shadow database replication tool 450 and the shadow database row ID tool 460 may include instructions or statements that execute on the processor 402 or instructions or statements that are interpreted by instructions or statements that execute on the processor 402 to carry out the functions as further described below. In certain embodiments, the shadow database replication tool 450 and the shadow database row ID tool 460 can be implemented in hardware via semiconductor devices, chips, logical gates, circuits, circuit cards, and/or other physical hardware devices in lieu of, or in addition to, a processor-based system. In embodiments, the shadow database replication tool 450 and the shadow database row ID tool 460 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts a representative of certain major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A method for row level auditing of partition operations, comprising:
   replicating a source table to create a shadow table that is hidden from users of the source table;
   maintaining transactional consistency between the source table and the shadow table;
   replicating, in response to receiving standard row level operations for the source table, row level operations into the shadow table;
   transmitting, in response to a partition-level operation on the source table, information about the partition-level operation to the shadow table;
   retrieving, using the information about the partition-level operation, rows from the shadow table designated as being part of the partition-level operation;
   constructing a row-level entry for each retrieved row;
   recording each row-level entry in an audit table; and
   implementing, in response to completion of the constructing a row-level entry for each retrieved row, the partition-level operation on the shadow table.

2. The method of claim 1, further comprising:
   queuing database operations received while retrieving, using the information about the partition-level operation, rows from the shadow table; and
   implementing the queued database operations after implementing the partition-level operation on the shadow table.

3. A computer program product, the computer program product comprising a computer readable storage medium having program instructions embodied therewith, the program instructions executable by a computer to cause the computer to:
   replicate a source table to create a shadow table that is hidden from users of the source table;
   maintain transactional consistency between the source table and the shadow table;
   replicate, in response to receiving standard row level operations for the source table, row level operations into the shadow table;
   transmit, in response to a partition-level operation on the source table, information about the partition-level operation to the shadow table;
   retrieve, using the information about the partition-level operation, rows from the shadow table designated as being part of the partition-level operation;
   construct a row-level entry for each retrieved row;
   record each row-level entry in an audit table; and
   implement, in response to completion of the constructing a row-level entry for each retrieved row, the partition-level operation on the shadow table.

4. The computer program product of claim 3, wherein the program instructions further cause the computer to:
   queue database operations received while retrieving, using the information about the partition-level operation, rows from the shadow table; and
   implement the queued database operations after implementing the partition-level operation on the shadow table.

5. A system comprising:
   a processor; and
   a memory in communication with the processor, the memory containing program instructions that, when executed by the processor, are configured to cause the processor to perform a method, the method comprising:
   replicating a source table to create a shadow table that is hidden from users of the source table;
   maintaining transactional consistency between the source table and the shadow table;
   replicating, in response to receiving standard row level operations for the source table, row level operations into the shadow table;
   transmitting, in response to a partition-level operation on the source table, information about the partition-level operation to the shadow table;
   retrieving, using the information about the partition-level operation, rows from the shadow table designated as being part of the partition-level operation;
   constructing a row-level entry for each retrieved row;
   recording each row-level entry in an audit table; and
   implementing, in response to completion of the constructing a row-level entry for each retrieved row, the partition-level operation on the shadow table.

6. The system of claim 5, wherein the method further comprises:
   queuing database operations received while retrieving, using the information about the partition-level operation, rows from the shadow table; and implementing the queued database operations after implementing the partition-level operation on the shadow table.

\* \* \* \* \*